United States Patent [19]
Beach

[11] 3,917,126
[45] Nov. 4, 1975

[54] FEEDING DEVICE

[76] Inventor: William H. Beach, 912 Greenwood Court, New Albany, Ind. 47150

[22] Filed: July 16, 1974

[21] Appl. No.: 488,979

[52] U.S. Cl. ............................... 222/195; 222/239
[51] Int. Cl.² .......................................... B65G 3/12
[58] Field of Search ........... 222/195, 196, 235, 236, 222/238, 239, 240, 241, 242; 259/DIG. 17, 107, 108

[56] References Cited
UNITED STATES PATENTS

| | | | |
|---|---|---|---|
| 3,307,748 | 3/1967 | Dunn | 222/240 X |
| 3,366,282 | 1/1968 | Lucas | 222/195 |

FOREIGN PATENTS OR APPLICATIONS

| | | | |
|---|---|---|---|
| 943,085 | 11/1963 | United Kingdom | 259/DIG. 17 |

*Primary Examiner*—Robert B. Reeves
*Assistant Examiner*—Larry H. Martin

[57] ABSTRACT

A feeding device including a hopper with a discharge outlet therein including a movably mounted vertically extending hollow shaft disposed concentrically within the hopper having an inlet in fluid communication with an air supply. The hollow shaft further includes at its discharge end a nozzle adjacent to the hopper discharge outlet and movable upon movement of the hollow shaft. Transversely extending across the vertically extending hollow shaft is a horizontally extending member with a blade attached to one end thereof and a downwardly extending member having a lower extremity adjacent to the hopper outlet attached to the opposite end thereof.

9 Claims, 1 Drawing Figure

U.S. Patent Nov. 4, 1975 3,917,126
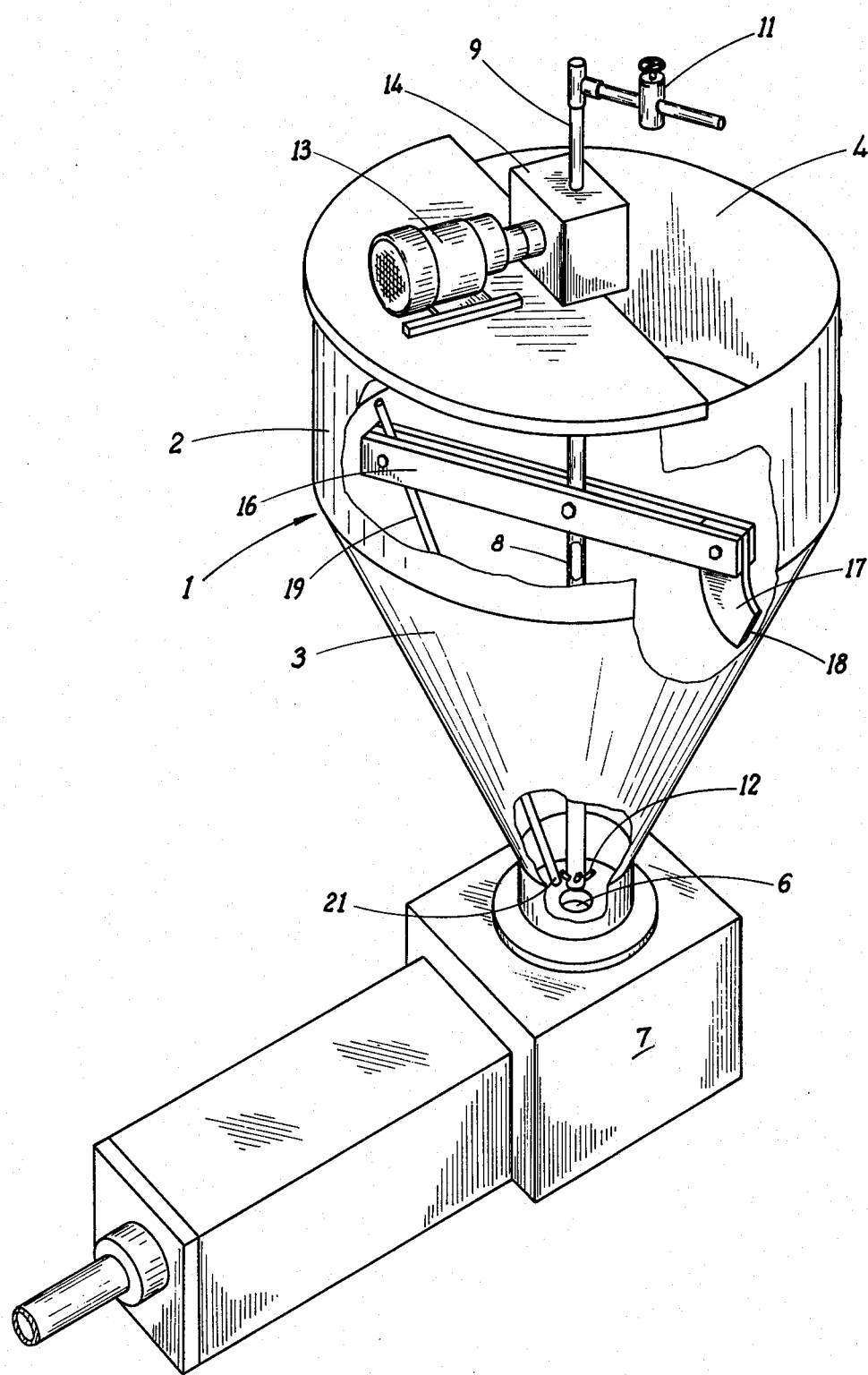

3,917,126

FEEDING DEVICE

BACKGROUND OF THE INVENTION

This invention relates to a feeding device and more particularly to a feeding device for dispensing non-free flowing flaky, powdery or granular materials to plastic molding presses.

Feed devices for delivering flaky, powdery or granular materials used in plastic molding presses have generally encountered substantial difficulty in uniformly feeding these materials to said presses. These materials have the tendency to cake in the delivery hoppers of said feed devices or form bridges across the discharge outlet of the delivery hoppers thereby causing this non-uniformity of feed to the molding presses.

SUMMARY OF THE INVENTION

In the present invention, it is recognized that it is desirable to provide a feed device for feeding flaky, powdery or granular material to plastic molding presses. It is further recognized that it is desirable to provide a feed device for feeding flaky, granular or powdery material to plastics molding presses which include a feed hopper with means therein to prevent the caking or wedging of the material within the hopper discharge. It is even further recognized that it is desirable to provide a feed device including a hopper means disposed therein to prevent build up of flaky, granular or powdery material along the inner walls of the feed hopper.

The present invention advantageously provides a straightforward arrangement for a feeding device for improving the feeding of non-free flowing flaky, powdery or granular material to plastics molding presses. The present invention further provides for a feed device for feeding non-free flowing flaky, powdery or granular materials to plastic molding presses which is economical to manufacture, economical to operate and requires a relatively small area.

Various other features of the present invention will become obvious to those skilled in the art upon reading the disclosure set forth hereinafter.

More particularly, the present invention provides a feeding device comprising: a hopper having an outlet and an inlet; a movably mounted vertically extending hollow shaft having an inlet and an outlet disposed concentrically within said hopper and driven by motor driving means, said shaft inlet being in fluid communication with an air supply means, said shaft outlet being adjacent said hopper outlet; a horizontally extending member attached to said movably mounted shaft, said horizontal member having a blade means attached to one end thereof, said blade means being spaced from and adjacent to the inner wall of said hopper whereby upon movement of said hollow shaft said blade means prevents build up of feed material on the inner walls of said hopper; and, a movably mounted downwardly extending member having its lower extremity adjacent to said hopper outlet and driven by said driving means.

It is to be understood that the description of the examples of the present invention given hereinafter are not by way of limitation. Various modifications within the scope of the present invention will occur to those skilled in the art upon reading the disclosure set forth hereinafter.

Referring to the drawing:

The FIGURE is a perspective view, partially cut away, showing a preferred feed apparatus of the present invention.

Referring to the FIGURE, the feeding device of the present invention includes a feed hopper 1 with an upper portion 2 thereof of cylindrical configuration and a lower portion 3 thereof of conical configuration. The feed hopper 1 includes a feed inlet or opening 4 and a discharge outlet 6, the hopper 1 being disposed above and in flow through communication with a plastics molding press for delivering a flaky, powdery or granular material to an extruder screw of the plastic molding press. The plastic molding press including the extruder screw is enclosed within the housing identifiable by the numeral 7.

Concentrically disposed within the hopper 1 is a hollow shaft 8 which is rotary mounted in fluid flow communication with an air supply source (not shown) by way of stationarily mounted conduit 9. Disposed in fluid flow communication with a conduit 9 is a regulator 11 which is provided for regulating the flow of air through the hollow shaft 8. At the lower end of the hollow shaft 8 is a plurality of nozzles 12, nozzles 12 being provided for supplying air under pressure to preselected locations adjacent to the hopper discharge 6. The nozzles 12 are illustrated as being angled slightly upward whereby air is supplied under pressure away from the discharge outlet 6 thereby preventing the bridging or wedging of material at an area above and adjacent to the discharge outlet 6.

Disposed atop the hopper 1 is a motor 13 which through proper gearing in the gear housing box 14 provides for the means for rotating the hollow shaft 8.

Transversely extending and attached to the hollow shaft 8 is a horizontally extending support member 16. At one end of the horizontally extending member 16 is a blade or scraper 17. Scraper 17 extends outward in a downwardly direction toward the inner wall of the conical portion 3 of the hopper 1. The scraper 17 is provided with an inclined blade edge 18 which is spaced from the inner wall of the cone portion 3 and is parallel thereto. Upon rotation of the hollow shaft 8 scraper 17 moves material away from the side walls thereof of the conical portion 3 thereby preventing build up of material at the upper portion of the cone 3. At the other end of the horizontal member 16 is a rod member 19 which extends downwardly toward the discharge outlet 6 with a tip 21 thereon adjacent to and spaced from the outlet 6. Upon rotation of the hollow shaft 8 the rod 19 including the tip 21 prevents bridging and build up of flaky, powdery material in the discharge outlet 6 and further provides a uniform flow of material toward the discharge outlet.

In operation of the feed device of the present invention it has been found that air pressure from nozzles 12 exerting a pressure away from the outlet 6 in combination with the stirring of rod 19 adjacent to the discharge 6 results in a relatively non-free flowing material being fed uniformly from the hopper 1 through the discharge outlet 6 and into the extruder screw 7.

It will be realized that various changes may be made to specific embodiments shown and described without departing from the principals of the present invention.

What is claimed is:

1. A feeding device for feeding non-free flowing powdery material comprising: a hopper having an inlet and an outlet; a movably mounted vertically extending hollow shaft having an inlet and an outlet, said shaft being disposed concentrically within said hopper, and driven by motor driving means, said shaft inlet being in fluid communication with an air supply means, said shaft outlet being adjacent said hopper outlet, said air supply means providing an air flow through said shaft outlet circumferentially around said hopper outlet upon movement of said hollow shaft; a horizontally extending member attached to said movably mounted shaft, said horizontal member having a blade means attached to one end thereof, said blade means being spaced from and adjacent to the inner wall of said hopper whereby upon movement of said hollow shaft said blade means prevents build up of feed material on the inner walls of said hopper; and, a downwardly extending member attached to said horizontally extending member, said downwardly extending member having a tip at its lower extremity adjacent to said hopper outlet, said tip moving circumferentially around said hopper outlet upon movement of said hollow shaft.

2. The feeding device of claim 1 wherein said hopper is provided with a cylindrically shaped upper portion and a conically shaped lower portion.

3. The feeding device of claim 2 wherein said blade means includes an outwardly extending edge portion thereon spaced from and parallel to said conical shaped lower portion of said hopper.

4. The feeding device of claim 1 wherein said downwardly extending member is a rod, said rod being attached to said horizontally extending member.

5. The feeding device of claim 4, said rod being at one end of said horizontally extending member and disposed in an inward angularly direction.

6. The feeding device of claim 1 wherein said horizontally extending member extends transversely of said hollow shaft with said downwardly extending member being attached to the end opposite said blade means.

7. The feeding device of claim 1 including nozzle means in fluid communication with said outlet of said hollow shaft.

8. The feeding device of claim 7 wherein said nozzle means are directed upwardly.

9. The feeding device of claim 7 wherein said nozzle means are directed in an outward upwardly direction.

* * * * *